US008200789B2

(12) United States Patent
Boutboul et al.

(10) Patent No.: US 8,200,789 B2
(45) Date of Patent: Jun. 12, 2012

(54) METHOD, SYSTEM AND PROGRAM PRODUCT FOR AUTOMATED TOPOLOGY FORMATION IN DYNAMIC DISTRIBUTED ENVIRONMENTS

(75) Inventors: Irwin Boutboul, White Plains, NY (US); Dikran S. Meliksetian, Danbury, CT (US); Jean-Pierre Prost, Montpellier (FR); Nianjun Zhou, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 2198 days.

(21) Appl. No.: 10/963,028

(22) Filed: Oct. 12, 2004

(65) Prior Publication Data

US 2006/0080417 A1  Apr. 13, 2006

(51) Int. Cl.
*G06F 15/177* (2006.01)
(52) U.S. Cl. .......................................... 709/220; 709/221
(58) Field of Classification Search .................. 709/220, 709/221
See application file for complete search history.

(56) References Cited

U.S. PATENT DOCUMENTS

| | | | |
|---|---|---|---|
| 5,185,860 A | 2/1993 | Wu | |
| 5,367,635 A | 11/1994 | Bauer et al. | |
| 5,678,006 A | 10/1997 | Valizadeh et al. | |
| 5,751,963 A | 5/1998 | Umetsu | |
| 5,889,954 A | 3/1999 | Gessel et al. | 395/200.53 |
| 6,047,320 A | 4/2000 | Tezuka et al. | 709/223 |
| 6,108,702 A | 8/2000 | Wood | 709/224 |
| 6,141,655 A | 10/2000 | Johnson et al. | |
| 6,324,577 B1 | 11/2001 | Hirai | 709/223 |
| 6,425,005 B1 | 7/2002 | Dugan et al. | 709/223 |
| 6,426,947 B1* | 7/2002 | Banker et al. | 370/254 |
| 6,460,070 B1 | 10/2002 | Turek et al. | 709/202 |
| 6,480,889 B1 | 11/2002 | Saito et al. | 709/220 |
| 6,487,546 B1 | 11/2002 | Witkowski | |
| 6,512,478 B1 | 1/2003 | Chien | |
| 6,564,258 B1 | 5/2003 | Uniacke | 709/223 |
| 6,760,306 B1 | 7/2004 | Pan et al. | |
| 6,826,564 B2 | 11/2004 | Thompson et al. | |
| 7,031,288 B2 | 4/2006 | Ogier | |

(Continued)

FOREIGN PATENT DOCUMENTS

EP           0 984 585 A2    3/2000

(Continued)

OTHER PUBLICATIONS

I. Foster; "What is the Grid? A Three Point Checklist;" Jul. 20, 2002.

(Continued)

*Primary Examiner* — Adnan Mirza
(74) *Attorney, Agent, or Firm* — Cantor Colburn LLP; John Campbell (57) ABSTRACT

A method for automated topology formation in a dynamic distributed environment includes configuring a master node in an active topology having nodes and intercommunication paths between the nodes. The master node includes an automated topology formation application including a predefined topology policy definition and a representation of the active topology. The master node receives a communication from an entity, the communication including a topology event notification indicating an event affecting the active topology. Using the automated topology formation application, it is determined that the topology event notification affects a topology portion of the active topology and, based on the topology event notification, the representation of the affected topology portion of the active topology is modified according to the predefined topology policy definition.

62 Claims, 9 Drawing Sheets

U.S. PATENT DOCUMENTS

| | | | |
|---|---|---|---|
| 7,117,273 | B1 | 10/2006 | O'Toole et al. |
| 7,120,127 | B2 | 10/2006 | Fieremans |
| 7,263,597 | B2 | 8/2007 | Everdell et al. |
| 7,675,869 | B1 * | 3/2010 | Anker et al. ............ 370/255 |
| 2002/0091811 | A1 | 7/2002 | Schweitzer et al. |
| 2003/0012216 | A1 | 1/2003 | Novaes |
| 2003/0086425 | A1 | 5/2003 | Bearden et al. |
| 2004/0073673 | A1 | 4/2004 | Santos et al. |
| 2004/0098447 | A1 | 5/2004 | Verbeke et al. |
| 2004/0172466 | A1 | 9/2004 | Douglas et al. |
| 2004/0244006 | A1 | 12/2004 | Kaufman et al. |
| 2005/0105475 | A1 | 5/2005 | Norrgard et al. |
| 2005/0120101 | A1 | 6/2005 | Nocera |
| 2005/0154735 | A1 | 7/2005 | Breh et al. |
| 2005/0154790 | A1 | 7/2005 | Nagata et al. |
| 2007/0005808 | A1 | 1/2007 | Day |

FOREIGN PATENT DOCUMENTS

| | | |
|---|---|---|
| WO | WO 02/101572 | 12/2002 |

OTHER PUBLICATIONS

J. Cao et al.; "Perforance Evaluation of an Agent-Based Resource Management Infrastructure for Grid Computing."

Foster, Ian et al. "The Physiology of the Grid", Argonne National Laboratory & University of Chicago, Jun. 22, 2002.

Open Grid Services Architecture (OGSA), www.globus.org, Sep. 27, 2004.

Open Grid Services Architecture (OGSA), www.globus.org/about/related.html, Oct. 9, 2004.

Web Services Resource Framework (WS-RF), www.webservices.org/index.php/ws/content/view/full/4887, Oct. 11, 2004.

Web Services Resource Framework (WS-RF), www.webservices.org, Sep. 15, 2004.

* cited by examiner

METHOD, SYSTEM AND PROGRAM PRODUCT FOR AUTOMATED TOPOLOGY FORMATION IN DYNAMIC DISTRIBUTED ENVIRONMENTS

BACKGROUND

The present invention relates generally to control and management of a dynamic distributed environment of autonomous cooperating agents, and, more particularly, to control and management of resources in a grid computing environment.

Grid computing enables the virtualization of distributed computing and data resources such as processing, network bandwidth and storage capacity to create a single system image, granting users and applications seamless access to vast IT capabilities. Just as an Internet user views a unified instance of content via the Web, a grid user essentially sees a single, large virtual computer. At its core, grid computing is based on an open set of standards and protocols such as the Open Grid Services Architecture (OGSA), www.globus.org, and the Web Services Resource Framework (WS-RF), www-.webservices.org, both or which are incorporated herein by reference. These standards enable communication across heterogeneous, geographically dispersed environments. With grid computing, organizations can optimize computing and data resources, pool them for large capacity workloads, and share them across networks for enabling collaboration. Further information regarding the Open Grid Services Architecture (OGSA), and grid computing in general, may be found in the publication entitled, "*The Physiology of the Grid*", Ian Foster, Argonne National Laboratory & University of Chicago, Jun. 22, 2002 the contents of which are incorporated herein by reference in their entirety.

A basic premise of OGSA and WS-RF is that everything may be represented by a service or may be accessed and managed through services (i.e., a network enabled entity that provides some capability through the exchange of messages). Computational resources, storage resources, networks, programs and databases are all examples of such services. More specifically, OGSA represents everything as a Grid service (i.e., a Web service that conforms to a set of conventions and supports standard interfaces for such purposes as lifetime management). This core set of consistent interfaces, from which all Grid services are implemented, facilitates the construction of higher order services that can be treated in a uniform way across layers of abstraction.

There are two common models currently used for control and management of a collective of independent entities, namely, the "centralized" model and the "hierarchical" model. In the centralized model, a central authority directly controls all the entities within the collective. Such a model is only feasible, however, if the size of the collective is limited. On the other hand, in the hierarchical model, the flow of control is mapped into a tree structure, wherein inner tree nodes have the responsibility of controlling their immediate children. In other words, each inner node directly controls only a limited number of entities (e.g., other inner nodes or leaf nodes). Although this model is more flexible in terms of the size of the collective, there are at least two limitations associated therewith.

First, the failure of an inner node immediately disconnects the sub-tree controlled by the failed inner node from the rest of the collective. Second, the hierarchical model is most efficient in a static environment, where all of the entities are known "a priori" and a balanced tree may be designed and implemented. However, in a dynamic environment (where entities constantly join and leave the collective), the maintenance of a balanced tree becomes more difficult. For example, some nodes will be forced to control an increasingly larger number of other entities, and eventually reaching a point where it becomes necessary to stop the operation of the collective and re-architect the hierarchical structure.

Accordingly, it would be desirable to be able to implement a management structure that provides a scalable and resilient mechanism for propagating control information throughout a collective, such as a computing grid or an ad-hoc network of mobile nodes, for example.

SUMMARY

The foregoing discussed drawbacks and deficiencies of the prior art are overcome or alleviated by a method for automated topology formation in a dynamic distributed environment. In an exemplary embodiment, the method includes configuring a master node in an active topology wherein a topology includes nodes and intercommunication paths between the nodes, and wherein the nodes include one or more leaf nodes having only incoming edges thereto, one or more prime nodes having both incoming and outgoing edges, and one or more root nodes having only outgoing edges. The master node includes an automated topology formation application including a predefined topology policy definition and a representation of the active topology. The master node receives a communication from an entity, the communication including a topology event notification indicating an event affecting the active topology. Using the automated topology formation application, it is determined that the topology event notification affects a topology portion of the active topology and, based on the topology event notification, the representation of the affected topology portion of the active topology is modified according to the predefined topology policy definition.

In another embodiment, a method for automated topology formation in a dynamic distributed environment includes receiving, by an application of an entity having an initial topology role, topology information from a master node, wherein the initial topology role of the entity is any one of not-a-node, root node, prime node or leaf node. When the topology role of the entity is to change, the received information includes a new topology role that the receiving entity is to assume. When the topology role of the entity is to change and the new topology role is any one of a prime node or leaf node, the received information includes any one of a complete list of parent entities or a list of changes of parent entities that are parents to the entity in the topology. When the topology role of the entity is to change and the new topology role is any one of a root node or a prime node, the received information includes any one of a complete list of subordinate entities or a list of changes of subordinate entities that are subordinate to the entity in the topology. A local topology representation information is derived from the received topology information, wherein the topology representation information includes any one of: an entity topology role as any one of a not-a-node, root node, a prime node or a leaf node for the topology; a list of entities that the entity is subordinate to in the topology, or a list of entities that are subordinates to the entity in the topology. The local topology representation information is then set at the entity.

BRIEF DESCRIPTION OF THE DRAWINGS

Referring to the exemplary drawings wherein like elements are numbered alike in the several Figures.

DETAILED DESCRIPTION

Disclosed herein is a mechanism for control and management of resources for a collective of independent but cooperating entities in dynamic distributed environments, such as resources included in a grid computing environment. The present invention embodiments create and preferably utilize an acyclic graph structure (in lieu of a tree structure), such that each entity therein receives control information from multiple parent nodes. Moreover, the selection of the parent nodes is dynamic, thus allowing for on-line "morphing" of the acyclic graph as new entities join the collective or as existing entities leave the collective. The scheme disclosed by the present invention embodiments provides a scalable and resilient mechanism for propagating control information throughout a collective, such as a large, distributed grid infrastructure. Furthermore, the graph structure allows for configuration software deployment, policy management, information services deployment and querying within a distributed grid infrastructure.

As further discussed herein, entities (e.g., grid resources) are preferably organized in a global acyclic directed graph, wherein each resource on the grid is a node of the graph. The distributed environment automatically configures itself, based on pre-specified policies, into a topology. Examples of distributed environments that would benefit from this scheme include, but are not limited to, computational grids, peer-to-peer networks, and ad-hoc mobile networks. The resulting system thus is highly dynamic and resilient to variation in node status, location. Thus configured, information may be propagated within the graph, using the distributed structure provided thereby, instead of having a 1 to n (main server and n clients) managed architecture. A resource may be either a simple resource (leaf node) or a "prime," wherein a prime is a resource in the graph that acts as a "light management" or secondary management node. In this regard, the prime forwards the management requests down the graph, either to other primes or to simple resources.

Figure 1:
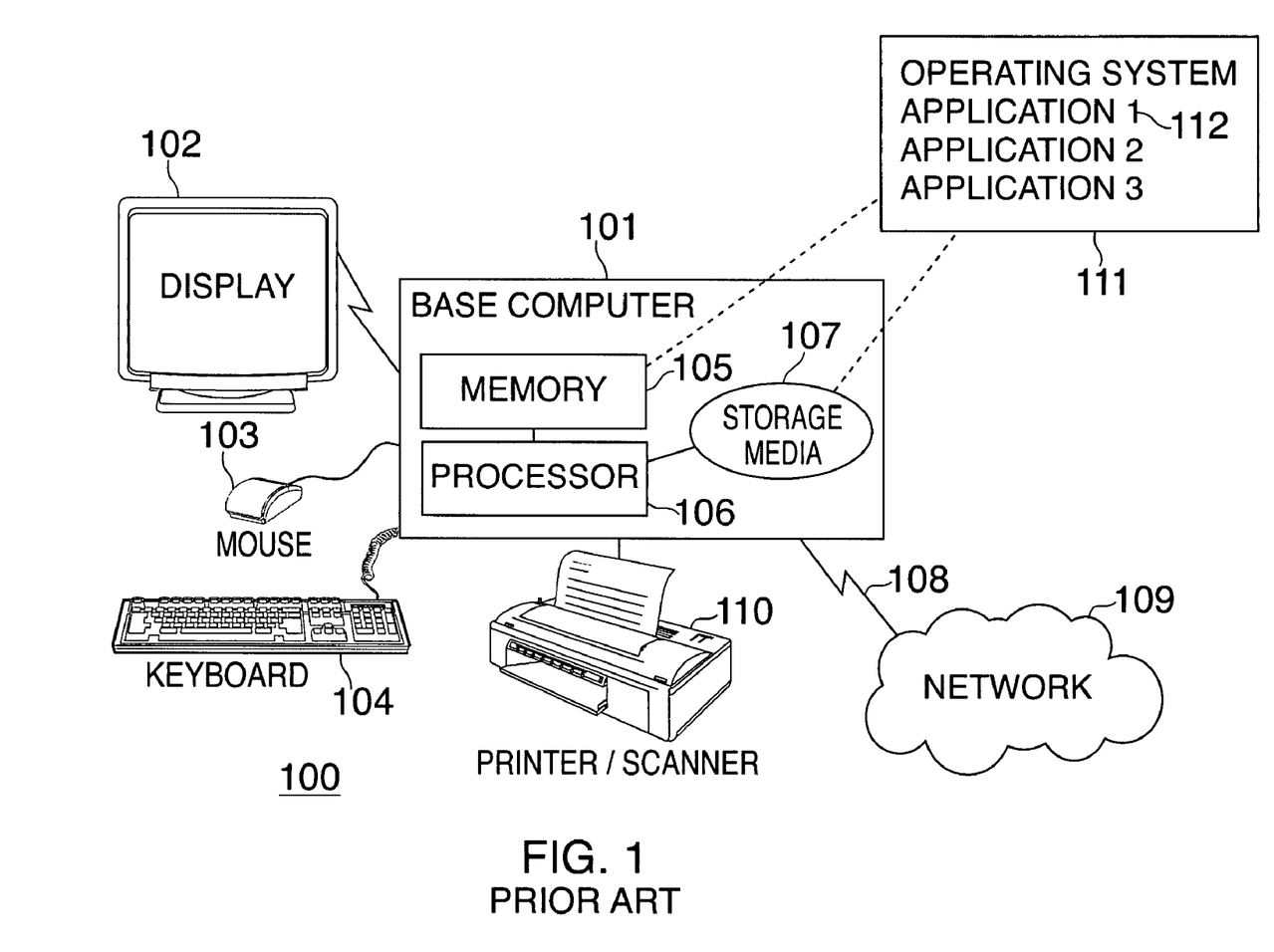
FIG. 1 is a schematic diagram of a representative workstation or server hardware system in which the present invention may be practiced.

Referring to FIG. 1, there is shown a representative workstation or server hardware system 100 in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Exemplary network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
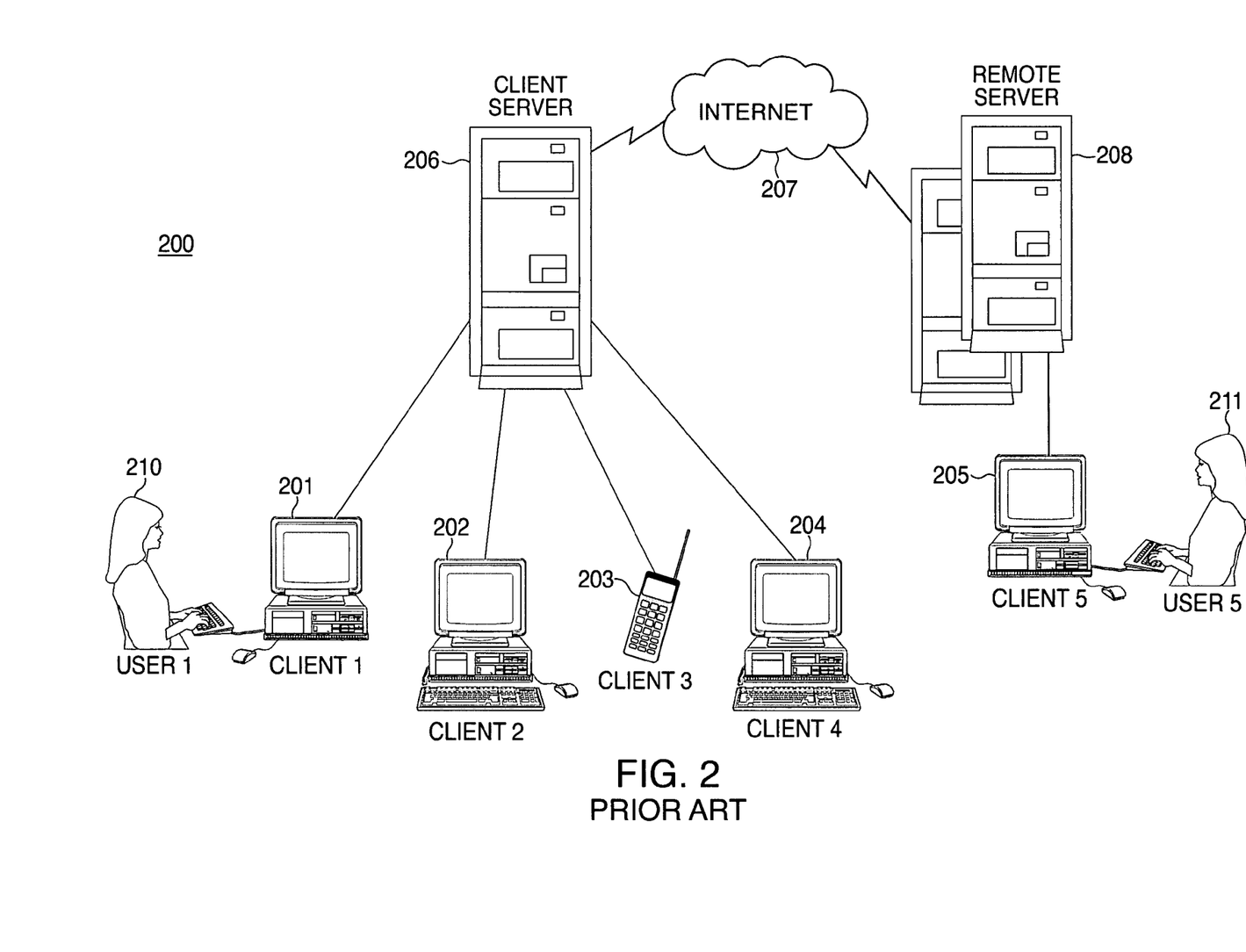
FIG. 2 is a schematic diagram of a data processing network in which the present invention may be practiced.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when correcting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zServer 900 Server available from IBM.

Software programming code that embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system, which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the preferred embodiment, the present invention is implemented as one or more computer software programs 111. The implementation of the software of the present invention may operate on a user's workstation, as one or more modules or applications 111 (also referred to as code subroutines, or "objects" in object-oriented programming), which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

The application domain of the invention is a mechanism for creating topologies in dynamic distributed environments made up of independent but cooperating entities. Those topologies can be represented as overlays on the physical network interconnecting the entities. The purpose of forming the overlay topology is for enabling an efficient mechanism for tighter collaboration and better synchronization between the entities. The tighter collaboration and better synchronization is achieved through an efficient mechanism for propagating control information and a timely and scalable mechanism for gathering and maintaining this information.

Certain features characteristic of a dynamic distributed environment (and to which the present invention embodiments are particularly applicable), include for example, that:
 the number of entities is large;
 the participation of entities in the environment changes dynamically;
 entities within the environment might unexpectedly become unreachable;
 the individual entities have a limited a priori knowledge about the environment;
 the entities have no a priori knowledge about one another;
 the entities have limited trust with one another; and
 there are no security guarantees within the environment.

In the specific case of computational grids, the "entities" are the resources that make up the grid, and the purpose of forming the topology may be (for example) to provide a distributed management overlay or an information gathering and distribution overlay.

Regardless of the specific type dynamic distributed environment involved, the formation of a topology is based on a policy. In addition, multiple topologies, each abiding to a different policy, may be formed within a given distributed environment. Moreover, these topologies can coexist and operate simultaneously. For example, in an ad-hoc mobile network, it might be useful to define a topology consisting of a minimal spanning tree for transferring voice data, and to simultaneously define a reliable topology where there are at least two independent paths between every pair of nodes for transferring critical text data.

Topology Characteristics

As indicated previously, the individual entities of the collective are associated in a global acyclic directed graph. In an exemplary embodiment, each entity of the collective is a node of the graph, wherein two nodes of the graph have an edge between the two if their role in the topology requires a direct communication therebetween. A specific entity within the distributed environment (referred to herein as the master node) performs the topology formation. Nodes that have only incoming edges are referred to as leaf nodes, while nodes that have both incoming and outgoing edges are referred to as primes. Nodes that have only outgoing edges are referred to as roots, wherein the graph may include more than one root therein.

The master node, while responsible for the creation of the graph topology, need not necessarily serve a distinguished role in the graph, and may be either a root, a prime, or a leaf node. Furthermore, each topology has an associated naming scheme therewith. One example of such a naming scheme may be to label each node as a path of nodes interconnecting the master node thereto. It will be noted that the naming itself is not unique, since in the acyclic graph there might be multiple paths between the master node and any other given node.

Topology Formation and Evolution

As mentioned earlier, the task of active topology formation is performed by the master node. Each entity in the distributed environment has a native mechanism for participating in the topology formation process, and for becoming a part of the topology itself. In the case of a service based computational grid, this might be implemented as a grid service (e.g., the Topology Formation Service) such that each grid resource is configured to deploy by default at initiation time.

Figure 3A:
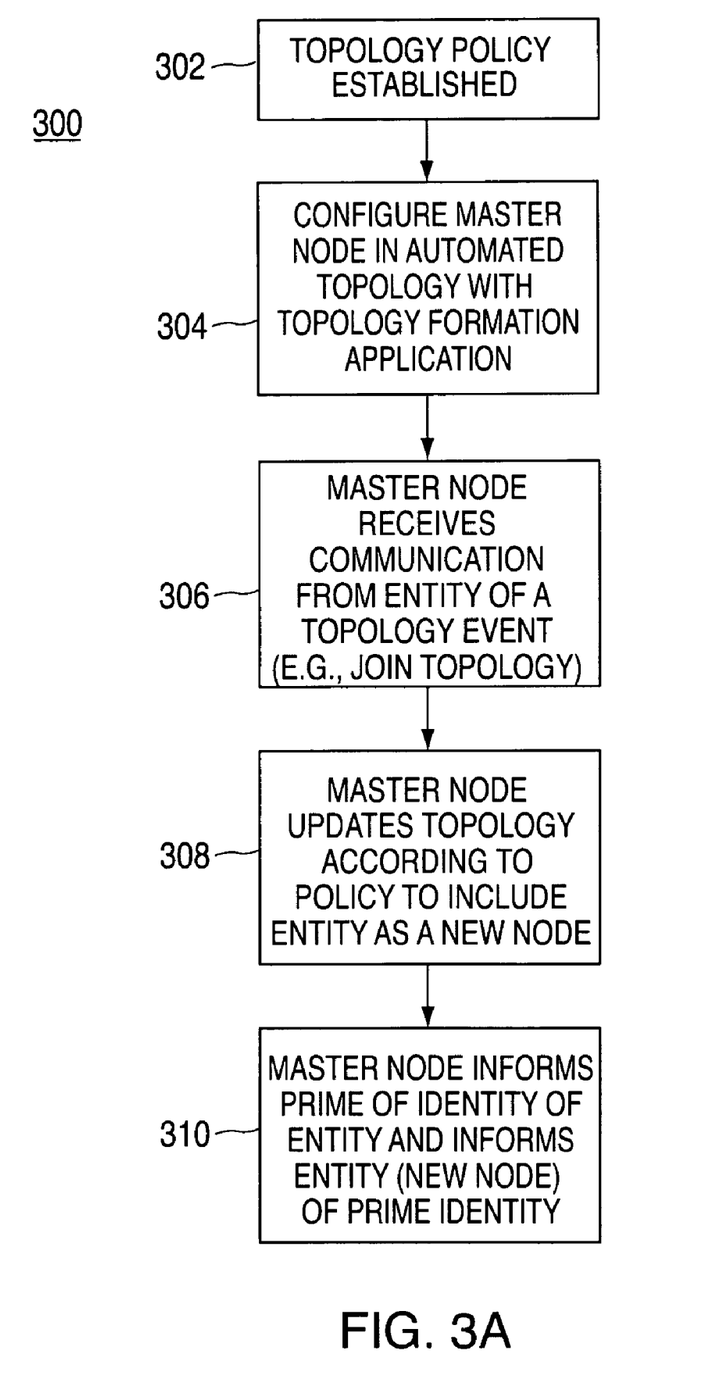
FIGS. 3A, 3B and 3C are block diagrams illustrating a method for automated topology formation in a dynamic, distributed environment, under various scenarios, in accordance with an embodiment of the invention.

Referring now to FIG. 3A, there is shown a block diagram 300 illustrating a method for automated topology formation in a dynamic, distributed environment, in accordance with an embodiment of the invention (for a specific example of a node to be added to the topology). As indicated in block 302, a predefined topology policy is in place, according to which entities are joined to, maintained within, and/or removed from the topology. Initially, the master node is configured in an automated topology, with a topology formation application, as shown at block 304. As shown in block 306, the master node receives a communication from an entity of a topology event (in this example, a request from the entity to join the topology). The master node then uses its automated topology application to update the topology (in accordance with the topology policy) to include this new entity as a node in the environment, as shown in block 308. In so doing, the master node may take one or more of the following actions:

(1) The master node determines one or more prime nodes that will act as prime nodes for the new entity.

(2) The master selects a leaf node, promotes it to the status of prime node and assigns this new prime node to act as a prime node for the new entity.

(3) The master node reshuffles a portion of the graph and determines a new topology for that portion that includes the new entity.

(4) The master node scraps the existing topology and builds a completely different topology that incorporates the new entity.

The determination of which particular actions to perform in selecting new prime nodes and updating the topology is based on the policy for the particular topology. In turn, the factors upon which the topology formation policy depends may include one or more of the following:
 the expected task or tasks performed by the prime nodes;

the capabilities and potentials of the nodes (wherein "capabilities" refer to the services offered by the node and "potential" refers to the hardware features); the capabilities of the communication network(s) interconnecting the nodes;

the desired security of the topology;

the desired reliability of the topology; and the desired performance of the topology.

By way of example, a sample topology policy for the dynamic distributed environment could provide for the following:

(1) prime nodes are to have no more than 10 children nodes;

(2) the network distance between a prime node and its child is less than 5 hops; and (3) a prime node having less than 2 nodes associated therewith is decommissioned unless such a decommissioning results in a violation of rule (2).

Referring again to FIG. 3A, and as shown in block 310, each time the master node assigns a prime to a new entity, it informs the prime of the identity of the new entity. The master node also informs the new entity of the prime identity. The prime and the new entity then interact in order to perform the task specified in the topology related service.

Figure 3B:
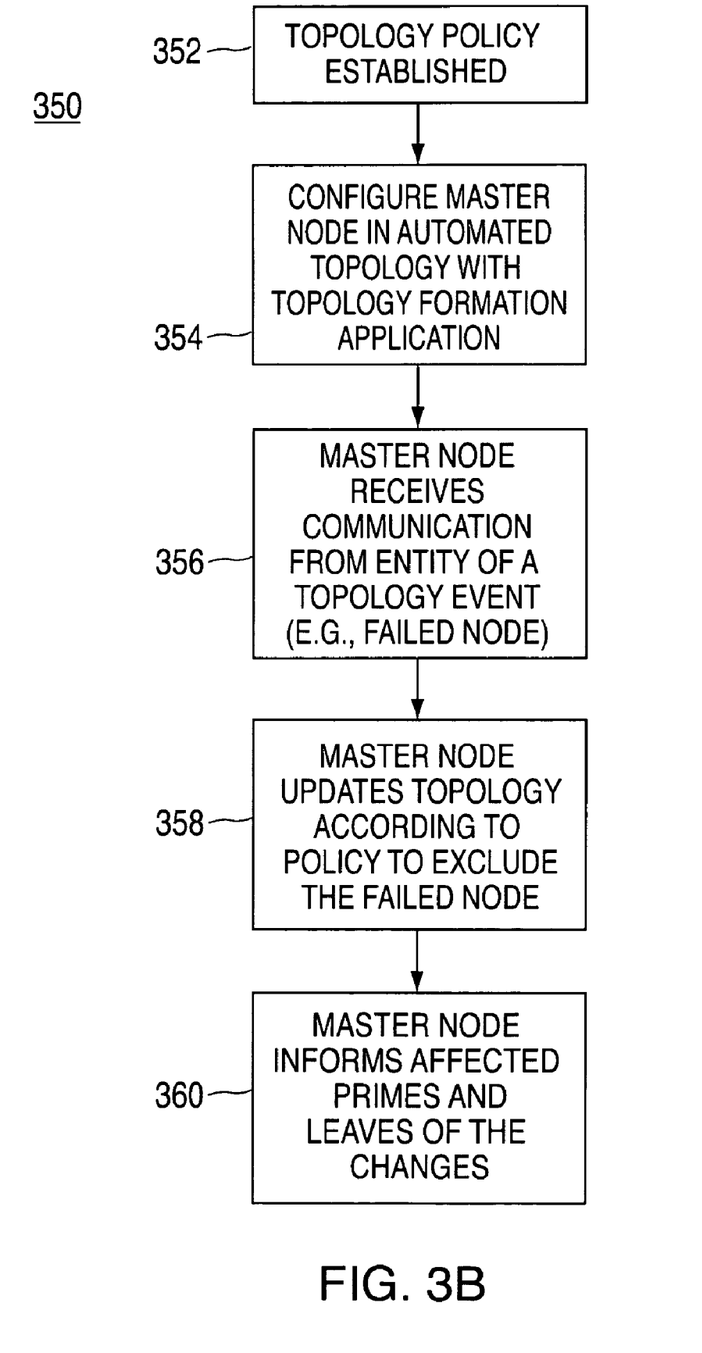

Referring now to FIG. 3B, there is shown a block diagram 350 illustrating a method for automated topology formation in a dynamic, distributed environment, in accordance with an embodiment of the invention (for a specific example of a node failure or node removal). As indicated in block 352, a predefined topology policy is in place, according to which entities are joined to, maintained within, and/or removed from the topology. Initially, the master node is configured in an automated topology, with a topology formation application, as shown at block 354. As shown in block 356, during normal operations, when an entity detects the failure or the absence of another entity, the master node receives a communication of this topology event from the entity and informs it of the situation. The master node then uses its automated topology application to update the topology (in accordance with the topology policy) to exclude the identified failed entity from the environment, as shown in block 358. In so doing, the master node may take one or more of the following actions:

(1) If the failed node is a leaf node:
  (a) The master leaves the topology as is.
  (b) The master node reshuffles a portion of the graph and determines a new topology for that portion that excludes the failed leaf node.
  (d) The master node scraps the existing topology and builds a completely different topology that excludes the failed leaf node.

(2) If the failed node is a prime node:
  (a) The master node determines one or more prime nodes that will take over the duties of the failed prime.
  (b) The master selects a leaf node, promotes it to the status of prime node and assigns this new prime node the duties of the failed prime.
  (c) The master node reshuffles a portion of the graph and determines a new topology for that portion that excludes the failed entity.
  (d) The master node scraps the existing topology and builds a completely different topology that excludes the failed entity.

The determination of which particular actions to perform in selecting new prime nodes and updating the topology is based on the policy for the particular topology. In turn, the factors upon which the topology formation policy depends may include one or more of the following:

the expected task or tasks performed by the prime nodes;

the capabilities and potentials of the nodes (wherein "capabilities" refer to the services offered by the node and "potential" refers to the hardware features);

the capabilities of the communication network(s) interconnecting the nodes;

the desired security of the topology;

the desired reliability of the topology; and the desired performance of the topology.

Referring again to FIG. 3B, and as shown in block 360, each time the master node changes the topology, it informs the affected primes and leaf nodes of the changes and the new relationships. The nodes then interact in order to perform the task specified in the topology related service.

Figure 3C:
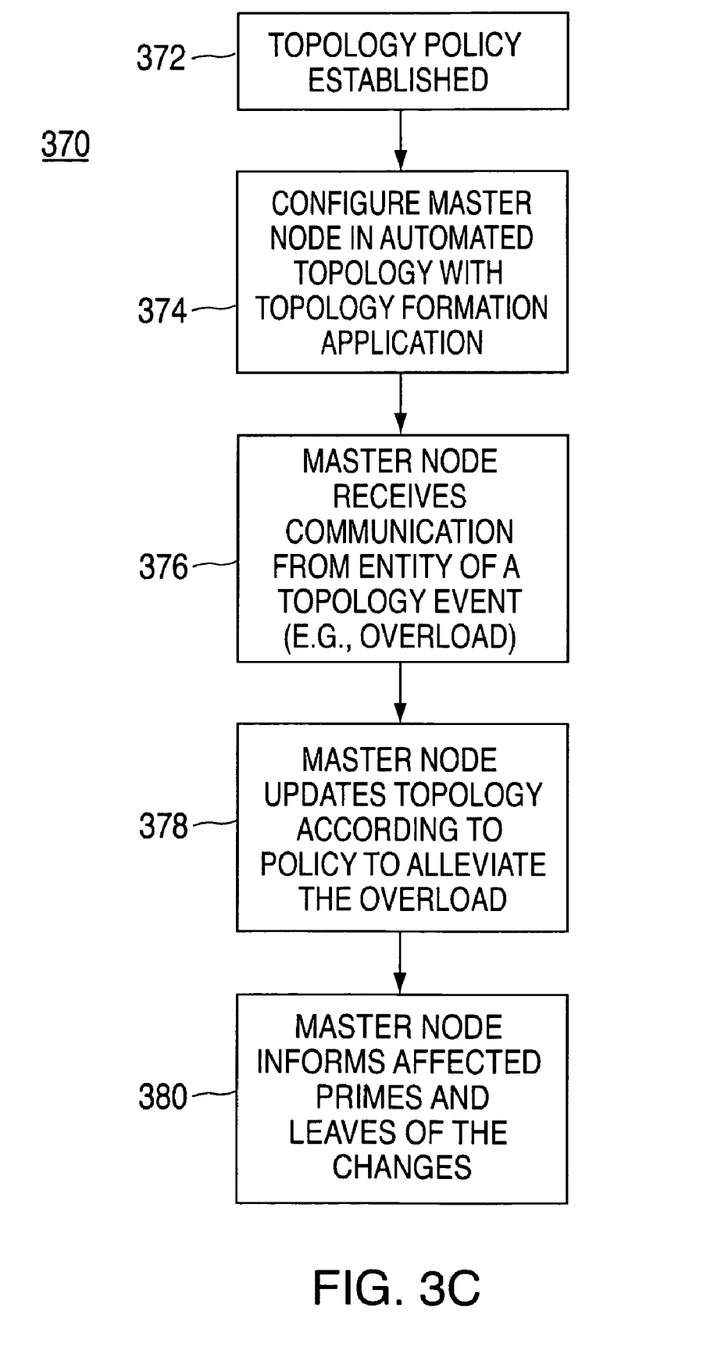

Referring now to FIG. 3C, there is shown a block diagram 370 illustrating a method for automated topology formation in a dynamic, distributed environment, in accordance with another embodiment of the invention (for a specific example of a node experiencing an "overload" condition, where the overload condition refers to the amount of work that the node has to perform to maintain the topology compared with other duties of that node). As indicated in block 372, a predefined topology policy is in place, according to which entities are joined to, maintained within, and/or removed from the topology. Initially, the master node is configured in an automated topology, with a topology formation application, as shown at block 374. As shown in block 376, during normal operations, when an entity detects an overload condition, the master node receives a communication of this topology event from the entity and informs it of the situation. The master node then uses its automated topology application to update the topology (in accordance with the topology policy) to alleviate the overload from the environment, as shown in block 378. In so doing, the master node may take one or more of the following actions:

(1) The master node determines one or more prime nodes that will share the duties of the overloaded prime.

(2) The master selects a leaf node, promotes it to the status of prime node and assigns this new prime node some of the duties of the overloaded prime.

(3) The master node reshuffles a portion of the graph and determines a new topology for that portion that balances the load.

(4) The master node scraps the existing topology and builds a completely different topology that balances the load.

The determination of which particular actions to perform in selecting new prime nodes and updating the topology is based on the policy for the particular topology. In turn, the factors upon which the topology formation policy depends may include one or more of the following:

the expected task or tasks performed by the prime nodes;

the capabilities and potentials of the nodes (wherein "capabilities" refer to the services offered by the node and "potential" refers to the hardware features);

the capabilities of the communication network(s) interconnecting the nodes;

the desired security of the topology;

the desired reliability of the topology; and the desired performance of the topology.

Referring again to FIG. 3C, and as shown in block 380, each time the master node changes the topology, it informs the affected primes and leaf nodes of the changes and the new relationships. The nodes then interact in order to perform the task specified in the topology related service.

At any given time, the master node can contact the Topology Formation Service of any entity to convert a simple entity into a prime. Once an entity is converted to a prime, it then deploys the Prime Management Service and is ready to act as a prime. Similarly, the master node may request the Topology Formation Service of any prime to undeploy the Prime Management Service. However, before removing a selected prime from the topology, the master node first reassigns the entities previously reporting to the selected prime to another prime.

The distributed environment is further provided with the capability of monitoring the proper functioning of the Topology Formation Services. As the system detects malfunctioning entities, it will update the topology to fulfill the policy requirements.

Figure 4:
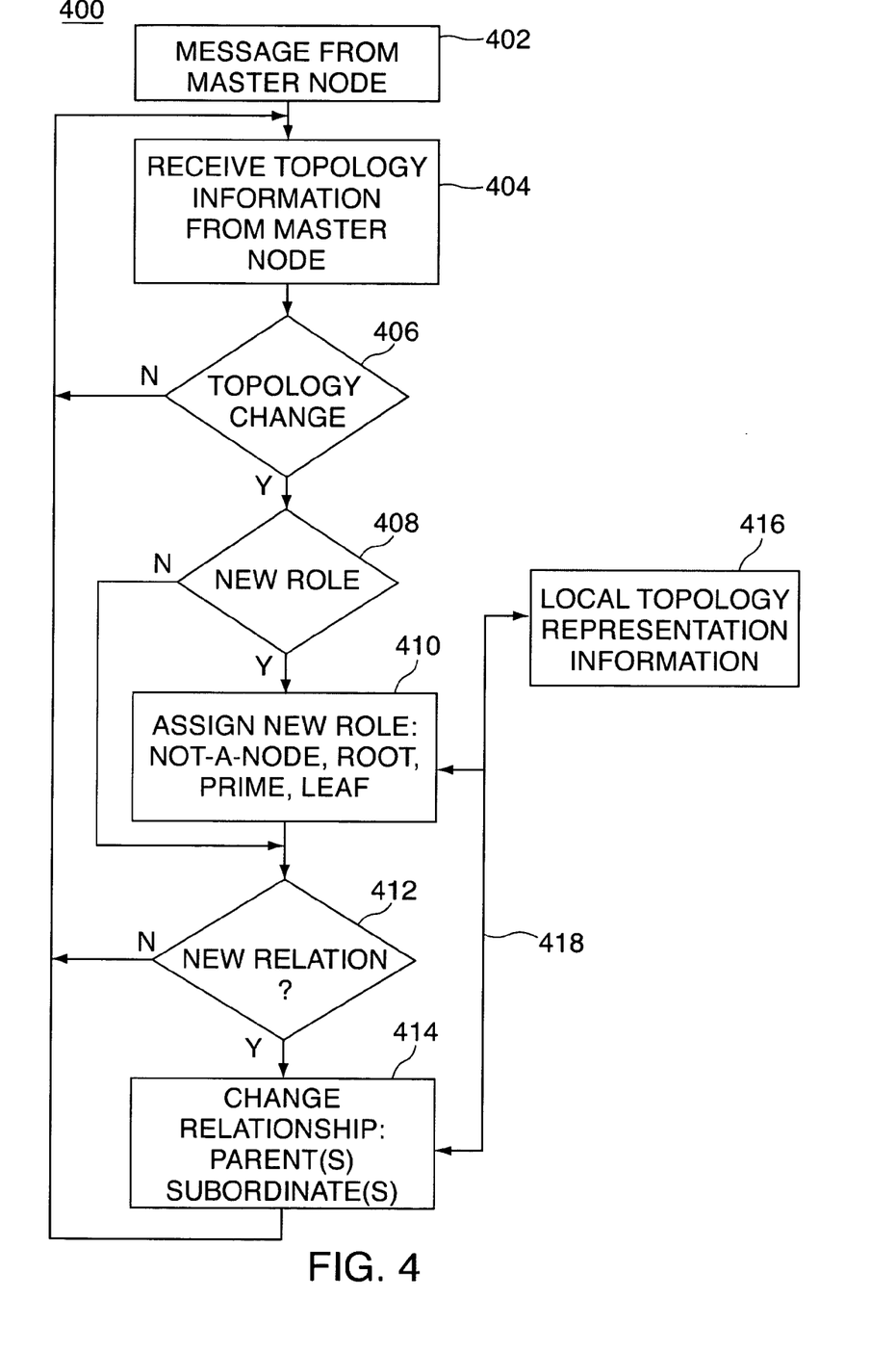
FIGS. 4 and 5 are flow diagrams of an exemplary embodiment of the execution of an application included within an entity associated with the topology.
Figure 5:
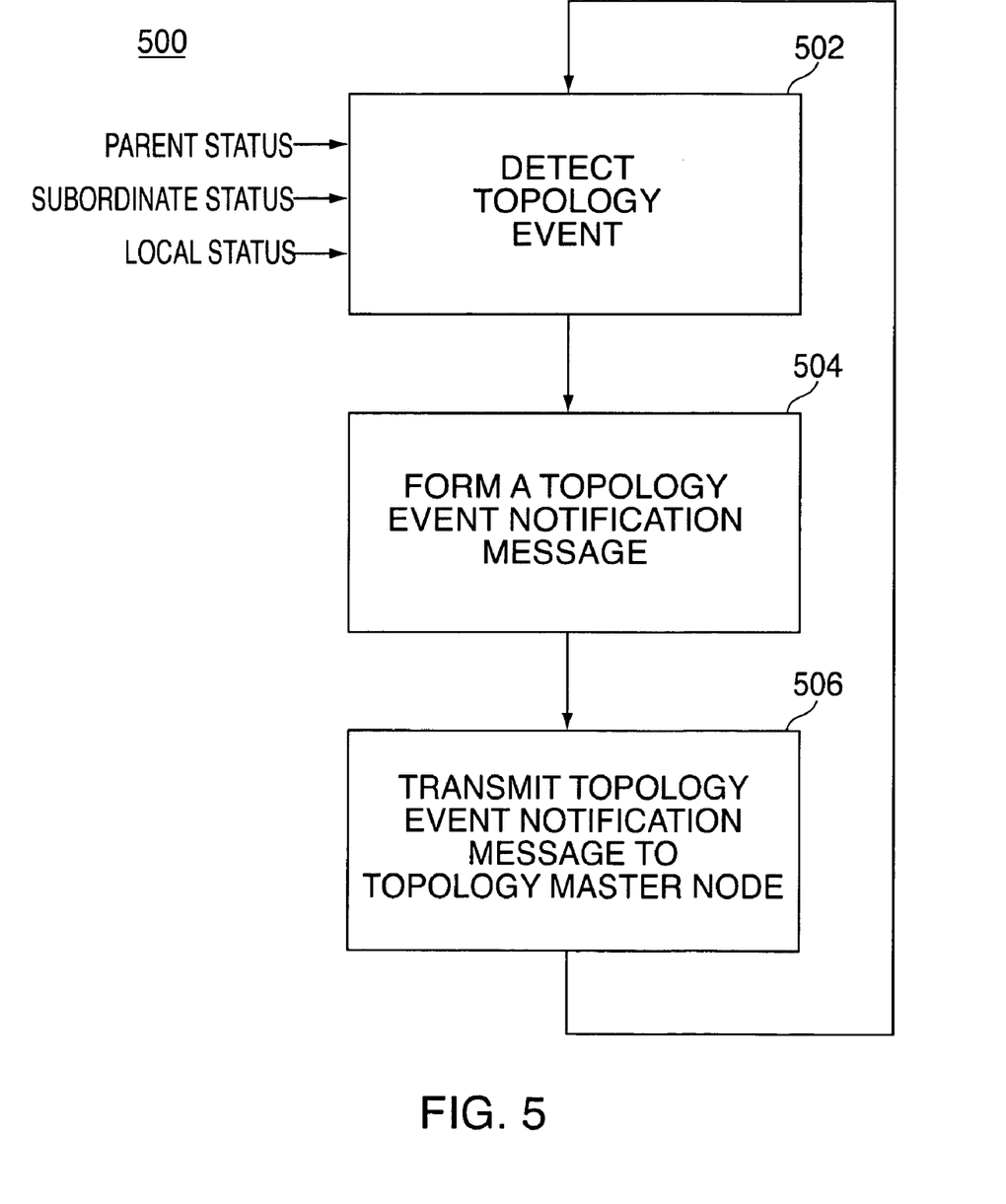

FIGS. 4 and 5 further illustrate the topology formation process from the perspective of the entity, which includes application software therein. The flow diagram 400 of FIG. 4 is illustrative of an exemplary embodiment of the execution of the application included within the entity. As shown in block 402, the entity receives a message from the master node, which may include topology information from the master node as indicated in block 404. At decision block 406, if the received topology information from the master node does not include a change in topology, the process returns to block 404. On the other hand, if the topology information received from the master node does contain a topology change, it is then determined at decision block 408 whether the entity is assigned a new role with respect to an initial topology role thereof. In the event a new role is to be assigned to the entity, the proceeds to block 410 for the new role assignment. As is shown, the new role may be one of: "not-a-node", "root", "prime" and "leaf".

An entity is assigned a "not-a-node" topology role when it is not part of the topology (e.g., it was not previously part of the topology or it is newly removed from the topology. Moreover, a topology affecting event notification may be initiated by an entity that is not affected by the event. For example, an entity discovers that another entity is not responding to a communication, wherein the other entity may not be a parent or subordinate to the entity notifying the master node of the event. Entities may be identified by methods known in the art including, but not limited to: a MAC address, an IP address, a URL, a fully qualified host name or an RFID. The topology of an entity is defined in part by the topology role and the identities of any parent entities and subordinate entities associated with it.

If the topology change does not result in a new (updated) topology role for the entity, then the process proceeds to decision block 412 to see whether the topology change results in a change in relationship (e.g., parent/child) for the entity. If this is not the case, then the process returns to block 404. However, if there is a relationship change with respect to the entity, then the entity's application will reflect this change, as shown in block 414, and the process will finally return to block 404. As is further shown in FIG. 4, both the entity's role and relationships with respect to the topology may also be represented locally therein, as shown in block 416 and communication path 418.

In addition to receiving a communication from the master node, FIG. 5 also illustrates another function 500 of the entity, in terms of detecting topology events and informing the master node of the same. As shown in block 502, the application software within the entity is configured to detect a topology event (e.g., topology addition, subtraction, overload condition or failure). In detecting the topology event, the entity has access to information concerning the status of any parent associated therewith, any subordinates (children) thereof, as well as its own local status. A topology event notification message is formed in block 504, and transmitted to the master node in block 506, the cycle repeating thereafter for each new topology event.

Figure 6:
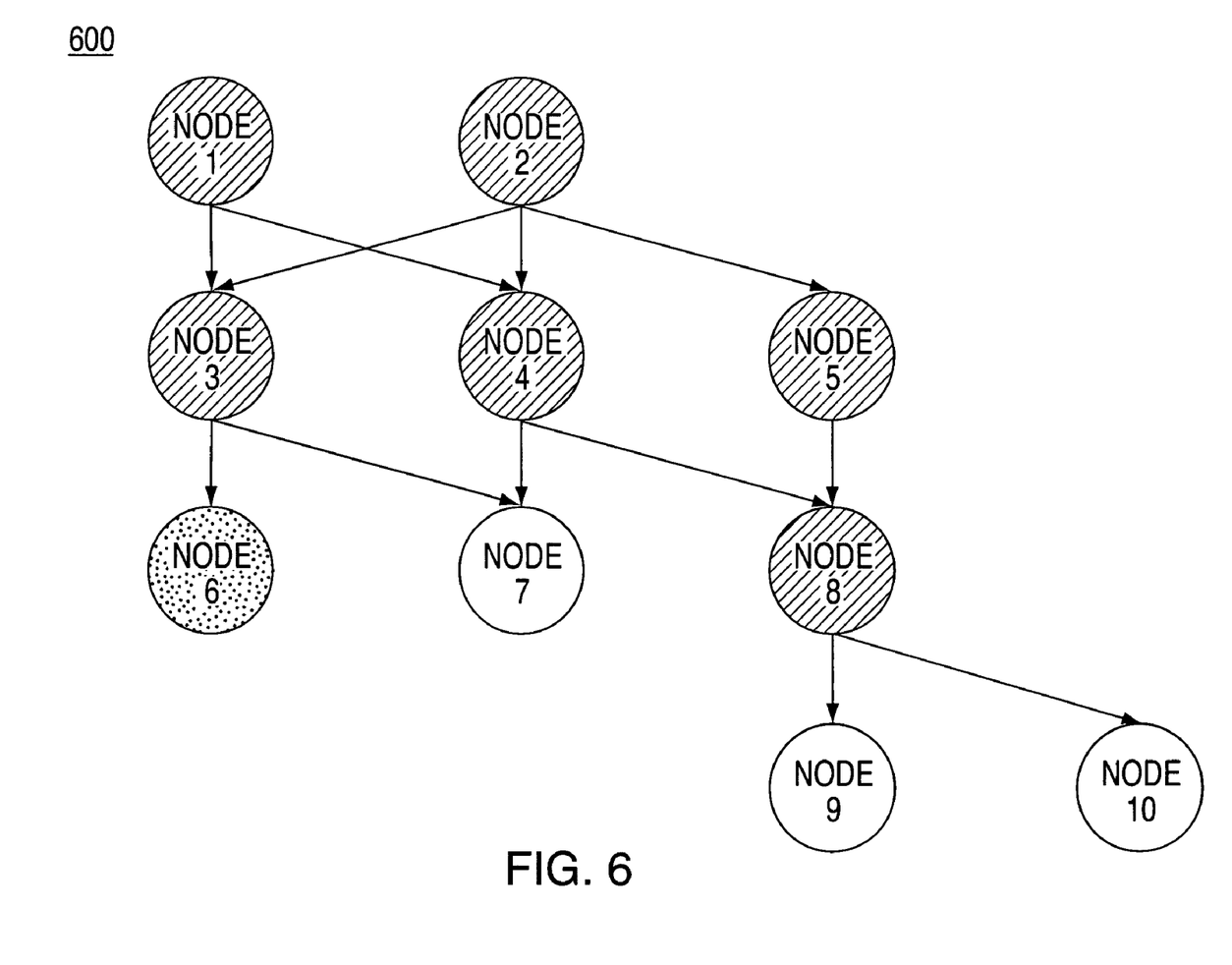
FIG. 6 is a diagram of an exemplary topology created in accordance with the method shown in FIG. 3, particularly illustrating the relationship between nodes, prime nodes and the master node.

FIG. 6 illustrates an example of a created topology 600 for a distributed environment having 10 nodes. In the example depicted, nodes 6, 7, 9, and 10 are considered leaf nodes, while nodes 1, 2, 3, 4, 5 and 8 are prime nodes. In addition, node 6 is the master node for the exemplary topology. The master node 6 is known a priori by all other nodes but need not play a special role in the formed topology (as particularly illustrated in FIG. 6, since master node 6 is a leaf node). The naming scheme is based on the master node 6. It is further noted that nodes 1 and 2 are root nodes and, as such, play a special role in the topology (i.e., supporting queries concerning the entire topology).

Figure 7:
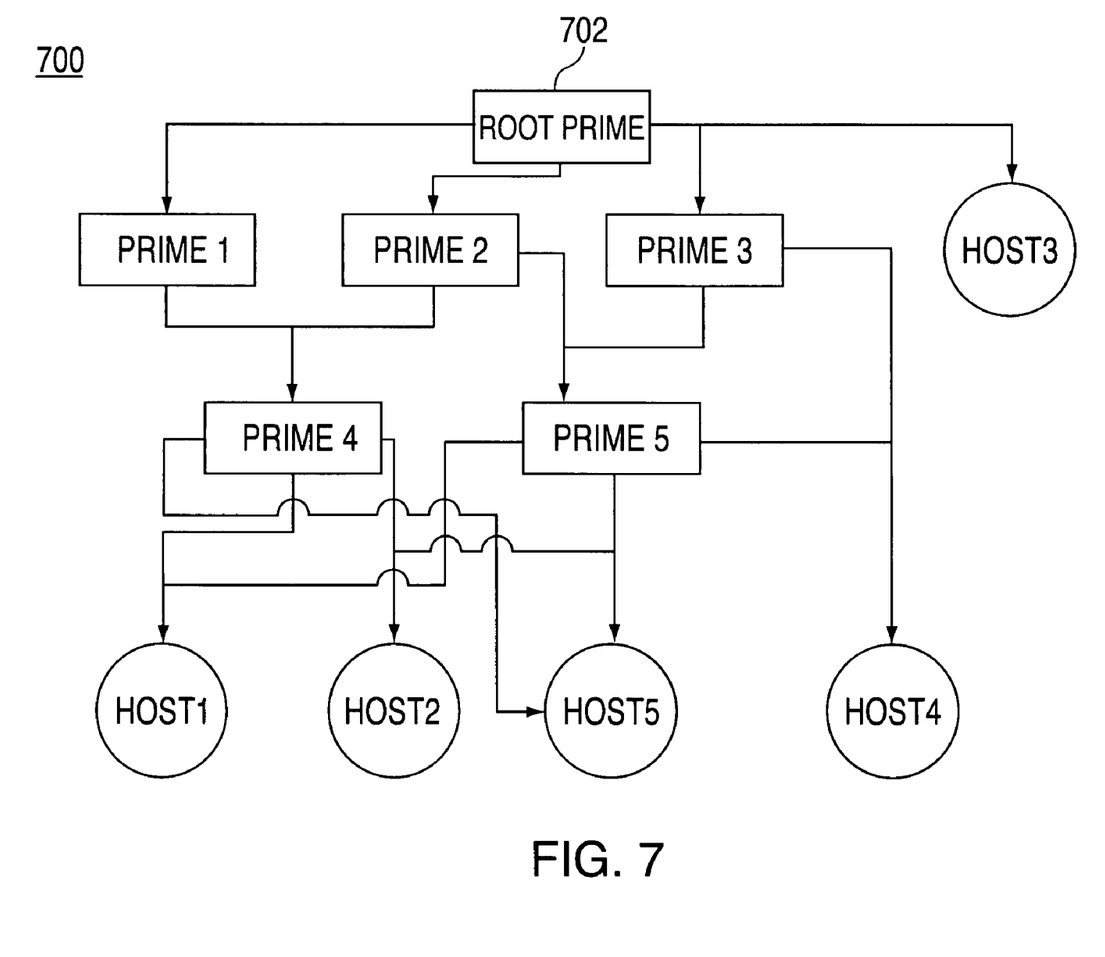
FIG. 7 is a diagram of another exemplary hierarchical topology created in a grid computing environment, particularly illustrating the relationship between hosts, primes, and the root prime.

FIG. 7 illustrates a more specific example of a topology 700 formed in an OGSA (Open Grid Services Architecture) based grid. The goal of forming such a topology is to provide a scalable and resilient mechanism to propagate control information throughout the grid. Again, information is propagated in the graph using its distributed structure, instead of having a 1 to n (one server and n clients) managed architecture. In the simple example depicted, the root prime node 702 is a node that serves as both the master node (topology formation) and the main management node. The other prime nodes (Prime 1-Prime 5) are resources in the graph that act as "light management" or secondary management nodes by forwarding management requests down the graph, either to other primes or to simple resources (hosts). For communication between the nodes, subscription-notification mechanisms are used. In an exemplary embodiment, the subscription-notification mechanisms specified in the OGSI (Open Grid Services Infrastructure) can be used. In another embodiment, the mechanisms specified by WS-Notification can be utilized. Each resource subscribes to either two primes or to the Root Prime.

Because the root prime 702 is also the master node, it therefore performs the topology formation process. Each resource on the grid has a Topology Formation Service that trusts only the root prime 702. Upon startup, the new grid resource contacts the root prime to determine where to "plug in" to the tree. The root prime then performs the following tasks, in accordance with the predefined policy:

(1) The root prime selects two primes (or only one, itself) for the new resource.

(2) The root prime notifies the selected primes of the identity of the new resource that will subscribe to the selected primes.

(3) The root prime informs the new resource of the name(s) of the selected prime(s).

At any time, the root prime may contact the Topology Formation Service of any simple resource (which trusts only the root prime) and instruct it to deploy the Prime Management Service. The newly appointed prime then deploys the Prime Management Service and is ready to act as a prime. In the same manner, the Root Prime can also contact the Topology Formation Service to undeploy the Prime Management Service. Before removing a particular prime, P, from the tree, the root prime first removes all the children of P, and reassigns them to one or more other primes. The root prime then removes prime P from the topology and alerts the previous primes of P that the role of P has changed.

Security Considerations

The security model of the FIG. 7 topology is based on PKI (Public Key Infrastructure). Each resource on the grid trusts the root prime certificate, and only the root prime is allowed to assign subscribers to each node of the tree. Furthermore, a resource will only accept to subscribe to a prime if it was assigned by the root prime. Correspondingly, a prime will only accept a subscriber if it was told to do so by the root prime.

Failure Detection

Finally, a mechanism for monitoring the system and detecting node failures, overload situations and other unexpected events is provided. In an exemplary embodiment, each prime sends keep-alive pings to its subscribers. If a subscriber does not receive pings from one of its primes, it alerts the root prime, by contacting the Failure Service. If a subscriber receives notifications from one of its primes and not the other, it also alerts the root prime. Once the root prime is alerted of a failure by a subscriber, it reacts accordingly by selecting new primes for the resource and updating the topology according to the active policy. In other embodiments, this function may be accomplished by constantly polling the primes for their availability and their load condition. This could be accomplished, for example, through scheduled polling.

As will be also appreciated, the above described method embodiments may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for automated topology formation in a dynamic distributed environment, the method comprising the steps of:

configuring a master node in an active topology wherein a topology comprises nodes and intercommunication paths between the nodes, wherein the nodes comprise one or more leaf nodes having only incoming edges thereto, one or more prime nodes having both incoming and outgoing edges, and one or more root nodes having only outgoing edges, the master node comprising an automated topology formation application, the automated topology formation application comprising a predefined topology policy definition and a representation of the active topology;

receiving at the configured master node a communication from an entity, said communication including a topology event notification, the topology event notification indicating an event affecting the active topology;

determining with the automated topology formation application that the topology event notification affects a topology portion of the active topology; and based on the topology event notification, modifying the representation of the affected topology portion of the active topology according to the predefined topology policy definition;

wherein said predefined topology policy is based on one or more of:

an expected set of tasks to be performed by a node, said node comprising a prime node;

services offered by a node, said node comprising any one of a not-a-node, leaf, prime or root node;

hardware features of a node, said node comprising any one of a not-a-node, leaf, prime or root node;

capabilities of one or more communication networks interconnecting nodes, said node comprising any one of a not-a-node, leaf, prime or root node;

a desired security of said topology;

a desired reliability of said topology; and a desired performance of said topology.

2. The method of claim 1, wherein the modifying step further comprises the steps of:

determining topology update information for corresponding affected nodes of the affected topology portion wherein the topology update information is determined based on the topology event notification; and transmitting the topology update information to corresponding affected nodes of the affected topology portion.

3. The method of claim 1, wherein said event affecting the active topology comprises one or more of:

an inquiry from the entity with respect to adding the entity to the active topology as a new node;

the removal of an existing node from the active topology; and an overload condition of an existing node within the active topology.

4. The method of claim 3, wherein for said event affecting the active topology of adding the entity to the topology as a new node, the master node selects a prime node for the entity, informs the selected prime of said entity, and informs the entity of the identity of the selected prime.

5. The method of claim 4, wherein said master node updates said topology by selecting one or more existing nodes in said topology to act as a prime for said entity.

6. The method of claim 4, wherein said master node updates said topology by promoting a leaf node to a prime node, and assigning said promoted prime node to said entity.

7. The method of claim 4, wherein said master node is further configured to reassign the relationship between nodes in a portion of said topology containing said entity.

8. The method of claim 4, wherein said master node is further configured to reconfigure said topology upon incorporating said entity therein.

9. The method of claim 3, wherein for said detected condition of the removal of an existing node from said topology, said master node updates said topology and informs affected primes and other entities of the updates.

10. The method of claim 9, wherein the removed node is a prime node, and said master node updates said topology by selecting one or more alternative prime nodes to perform the duties of said removed prime node.

11. The method of claim 9, wherein the removed node is a prime node, and said master node updates said topology by promoting a leaf node to a prime node to perform the duties of said removed prime node.

12. The method of claim 9, wherein said master node is further configured to reassign the relationship between nodes in a portion of said topology previously containing the removed node.

13. The method of claim 9, wherein said master node is further configured to reconfigure said topology to exclude the removed node.

14. The method of claim 3, wherein for said detected condition of an overload condition of an existing node within said topology, said master node updates said topology and informs affected primes and other entities of the updates.

15. The method of claim 14, wherein the overloaded node is a prime node, and said master node updates said topology by selecting one or more alternative prime nodes to share at least a portion of the duties of said overloaded prime node.

16. The method of claim 14, wherein the overloaded node is a prime node, and said master node updates the topology by promoting a leaf node to a prime node to share at least a portion of the duties of said overloaded prime node.

17. The method of claim 14, wherein said master node is further configured to reassign the relationship between nodes in a portion of said topology containing the overloaded node to reduce the load on the overloaded node.

18. The method of claim 14, wherein said master node is further configured to reconfigure said topology by balancing the load therein.

19. The method of claim 1, wherein one or more nodes are configured with a prime management service that enables said nodes to function as prime nodes, and wherein said master node is capable of commanding a node to deploy said prime management service associated therewith.

20. The method of claim 19, wherein said master node is further capable of commanding a node to undeploy said prime management service associated therewith.

21. The method of claim 20, wherein said master node is configured to remove a designated prime node from said topology by initially reassigning one or more nodes reporting to said designated prime node to one or more other prime nodes.

22. The method of claim 1, wherein said master node is also a leaf node within said topology.

23. The method of claim 1, wherein the dynamic distributed environment comprises a grid computing environment.

24. The method of claim 23, wherein:
said master node comprises a root prime;
said one or more prime nodes comprise primes; and
said one or more leaf nodes comprise hosts.

25. The method of claim 2, comprising the further steps of:
receiving, by an application of a first entity having an initial topology role, the topology update information from the master node, wherein the first entity has an initial topology role of any one of not-a-node, root node, prime node or leaf node, and:
when the topology role of the first entity is to change, the received information comprises a new topology role that the first entity is to assume;
when the topology role of the first entity is to change and the new topology role is any one of a prime node or leaf node, the received information comprises any one of a complete list of parent entities or a list of changes of parent entities that are parents to the entity in the topology;
when the topology role of the first entity is to change and the new topology role is any one of a root node or a prime node, the received information comprises any one of a complete list of subordinate entities or a list of changes of subordinate entities that are subordinate to the entity in the topology;
deriving a local topology representation information from the received topology information wherein the local topology representation information comprises any one of:
a first entity topology role as any one of a not-a-node, root node, a prime node or a leaf node for the topology;
a list of entities that are parents of the first entity in the topology, or
a list of entities that are subordinates to the first entity in the topology; and
setting the local topology representation information at the first entity.

26. A computer program product for automated topology formation in a dynamic distributed environment, comprising:
a non-transitory tangible computer readable storage medium readable by a processing circuit, the storage medium comprising machine readable computer program code including instructions for causing the processing circuit to perform a method, the method further comprising:
configuring a master node in an active topology wherein a topology comprises nodes and intercommunication paths between the nodes, wherein the nodes comprise one or more leaf nodes having only incoming edges thereto, one or more prime nodes having both incoming and outgoing edges, and one or more root nodes having only outgoing edges, the master node comprising an automated topology formation application, the automated topology formation application comprising a predefined topology policy definition and a representation of the active topology;
receiving at the configured master node a communication from an entity, said communication including a topology event notification, the topology event notification indicating an event affecting the active topology;
determining with the automated topology formation application that the topology event notification affects a topology portion of the active topology; and
based on the topology event notification, modifying the representation of the affected topology portion of the active topology according to the predefined topology policy definition;
wherein said predefined topology policy is based on one or more of:
an expected set of tasks to be performed by a node, said node comprising a prime node;
services offered by a node, said node comprising any one of a not-a-node, leaf, prime or root node;
hardware features of a node, said node comprising any one of a not-a-node, leaf, prime or root node;
capabilities of one or more communication networks interconnecting nodes, said node comprising any one of a not-a-node, leaf, prime or root node;
a desired security of said topology;
a desired reliability of said topology; and
a desired performance of said topology.

27. The computer program product of claim 26, comprising the further step of:
- determining topology update information for corresponding affected nodes of the affected topology portion wherein the topology update information is determined based on the topology event notification; and
- transmitting the topology update information to corresponding affected nodes of the affected topology portion.

28. The computer program product of claim 26, wherein said event affecting the active topology comprises one or more of:
- an inquiry from the entity with respect to adding the entity to the active topology as a new node;
- the removal of an existing node from the active topology; and
- an overload condition of an existing node within the active topology.

29. The computer program product of claim 28, wherein for said event affecting the active topology of adding the entity to the topology as a new node, the master node selects a prime node for the entity, informs the selected prime of said entity, and informs the entity of the identity of the selected prime.

30. The computer program product of claim 29, wherein said master node updates said topology by selecting one or more existing nodes in said topology to act as a prime for said entity.

31. The computer program product of claim 29, wherein said master node updates said topology by promoting a leaf node to a prime node, and assigning said promoted prime node to said entity.

32. The computer program product of claim 29, wherein said master node is further configured to reassign the relationship between nodes in a portion of said topology containing said entity.

33. The computer program product of claim 28, wherein for said detected condition of the removal of an existing node from said topology, said master node updates said topology and informs affected primes and other entities of the updates.

34. The computer program product of claim 33, wherein the removed node is a prime node, and said master node updates said topology by selecting one or more alternative prime nodes to perform the duties of said removed prime node.

35. The computer program product of claim 33, wherein the removed node is a prime node, and said master node updates said topology by promoting a leaf node to a prime node to perform the duties of said removed prime node.

36. The computer program product of claim 33, wherein said master node is further configured to reassign the relationship between nodes in a portion of said topology previously containing the removed node.

37. The computer program product of claim 33, wherein said master node is further configured to reconfigure said topology to exclude the removed node.

38. The computer program product of claim 28, wherein for said detected condition of an overload condition of an existing node within said topology, said master node updates said topology and informs affected primes and other entities of the updates.

39. The computer program product of claim 38, wherein the overloaded node is a prime node, and said master node updates said topology by selecting one or more alternative prime nodes to share at least a portion of the duties of said overloaded prime node.

40. The computer program product of claim 38, wherein the overloaded node is a prime node, and said master node updates the topology by promoting a leaf node to a prime node to share at least a portion of the duties of said overloaded prime node.

41. The computer program product of claim 38, wherein said master node is further configured to reassign the relationship between nodes in a portion of said topology containing the overloaded node to reduce the load on the overloaded node.

42. The computer program product of claim 38, wherein said master node is further configured to reconfigure said topology by balancing the load therein.

43. A system for automated topology formation in a dynamic distributed environment, comprising:
- a network;
- a first computer system in communication with the network, wherein the first computer system is configured to perform a method, the method further comprising:
  - configuring a master node in an active topology wherein a topology comprises nodes and intercommunication paths between the nodes, wherein the nodes comprise one or more leaf nodes having only incoming edges thereto, one or more prime nodes having both incoming and outgoing edges, and one or more root nodes having only outgoing edges, the master node comprising an automated topology formation application, the automated topology formation application comprising a predefined topology policy definition and a representation of the active topology;
  - receiving at the configured master node a communication from an entity, said communication including a topology event notification, the topology event notification indicating an event affecting the active topology;
  - determining with the automated topology formation application that the topology event notification affects a topology portion of the active topology; and
  - based on the topology event notification, modifying the representation of the affected topology portion of the active topology according to the predefined topology policy definition;
    - wherein said predefined topology policy is based on one or more of:
      - an expected set of tasks to be performed by a node, said node comprising a prime node;
      - services offered by a node, said node comprising any one of a not-a-node, leaf, prime or root node;
      - hardware features of a node, said node comprising any one of a not-a-node, leaf, prime or root node;
      - capabilities of one or more communication networks interconnecting nodes, said node comprising any one of a not-a-node, leaf, prime or root node;
      - a desired security of said topology;
      - a desired reliability of said topology; and
      - a desired performance of said topology.

44. The system of claim 43, further comprising:
- determining topology update information for corresponding affected nodes of the affected topology portion wherein the topology update information is determined based on the topology event notification; and
- transmitting the topology update information to corresponding affected nodes of the affected topology portion.

45. The system of claim 43, wherein said event affecting the active topology comprises one or more of:

an inquiry from the entity with respect to adding the entity to the active topology as a new node;

the removal of an existing node from the active topology; and an overload condition of an existing node within the active topology.

46. The system of claim 45, wherein for said event affecting the active topology of adding the entity to the topology as a new node, the master node selects a prime node for the entity, informs the selected prime of said entity, and informs the entity of the identity of the selected prime.

47. The system of claim 46, wherein said master node updates said topology by selecting one or more existing nodes in said topology to act as a prime for said entity.

48. The system of claim 46, wherein said master node updates said topology by promoting a leaf node to a prime node, and assigning said promoted prime node to said entity.

49. The system of claim 46, wherein said master node is further configured to reassign the relationship between nodes in a portion of said topology containing said entity.

50. The system of claim 46, wherein said master node is further configured to reconfigure said topology upon incorporating said entity therein.

51. The system of claim 45, wherein for said detected condition of the removal of an existing node from said topology, said master node updates said topology and informs affected primes and other entities of the updates.

52. The system of claim 51, wherein the removed node is a prime node, and said master node updates said topology by selecting one or more alternative prime nodes to perform the duties of said removed prime node.

53. The system of claim 51, wherein the removed node is a prime node, and said master node updates said topology by promoting a leaf node to a prime node to perform the duties of said removed prime node.

54. The system of claim 51, wherein said master node is further configured to reassign the relationship between nodes in a portion of said topology previously containing the removed node.

55. The system of claim 51, wherein said master node is further configured to reconfigure said topology to exclude the removed node.

56. The system of claim 55, wherein for said detected condition of an overload condition of an existing node within said topology, said master node updates said topology and informs affected primes and other entities of the updates.

57. The system of claim 56, wherein the overloaded node is a prime node, and said master node updates said topology by selecting one or more alternative prime nodes to share at least a portion of the duties of said overloaded prime node.

58. The system of claim 56, wherein the overloaded node is a prime node, and said master node updates the topology by promoting a leaf node to a prime node to share at least a portion of the duties of said overloaded prime node.

59. The system of claim 56, wherein said master node is further configured to reassign the relationship between nodes in a portion of said topology containing the overloaded node to reduce the load on the overloaded node.

60. The system of claim 56, wherein said master node is further configured to reconfigure said topology by balancing the load therein.

61. The computer program product of claim 27, comprising the further steps of:

receiving, by an application of a first entity having an initial topology role, the topology update information from the master node, wherein the first entity has an initial topology role of any one of not-a-node, root node, prime node or leaf node, and:

when the topology role of the first entity is to change, the received information comprises a new topology role that the first entity is to assume;

when the topology role of the first entity is to change and the new topology role is any one of a prime node or leaf node, the received information comprises any one of a complete list of parent entities or a list of changes of parent entities that are parents to the entity in the topology;

when the topology role of the first entity is to change and the new topology role is any one of a root node or a prime node, the received information comprises any one of a complete list of subordinate entities or a list of changes of subordinate entities that are subordinate to the entity in the topology;

deriving a local topology representation information from the received topology information wherein the local topology representation information comprises any one of:

a first entity topology role as any one of a not-a-node, root node, a prime node or a leaf node for the topology;

a list of entities that are parents of the first entity in the topology, or a list of entities that are subordinates to the first entity in the topology; and setting the local topology representation information at the first entity.

62. The system of claim 27, comprising the further steps of:

receiving, by an application of a first entity having an initial topology role, the topology update information from the master node, wherein the first entity has an initial topology role of any one of not-a-node, root node, prime node or leaf node, and:

when the topology role of the first entity is to change, the received information comprises a new topology role that the first entity is to assume;

when the topology role of the first entity is to change and the new topology role is any one of a prime node or leaf node, the received information comprises any one of a complete list of parent entities or a list of changes of parent entities that are parents to the entity in the topology;

when the topology role of the first entity is to change and the new topology role is any one of a root node or a prime node, the received information comprises any one of a complete list of subordinate entities or a list of changes of subordinate entities that are subordinate to the entity in the topology;

deriving a local topology representation information from the received topology information wherein the local topology representation information comprises any one of:

a first entity topology role as any one of a not-a-node, root node, a prime node or a leaf node for the topology;

a list of entities that are parents of the first entity in the topology, or a list of entities that are subordinates to the first entity in the topology; and setting the local topology representation information at the first entity.

* * * * *